(12) United States Patent
Takeda et al.

(10) Patent No.: US 6,750,975 B2
(45) Date of Patent: Jun. 15, 2004

(54) THREE-DIMENSIONAL SHAPE MEASURING METHOD

(75) Inventors: Mitsuo Takeda, Hachioji (JP); Teruaki Yogo, Nagoya (JP); Hideyuki Tanaka, Nagoya (JP); Ruowei Gu, Nagoya (JP)

(73) Assignee: Teruki Yogo, Nagoya (JP)

( * ) Notice: Subject to any disclaimer, the term of this patent is extended or adjusted under 35 U.S.C. 154(b) by 10 days.

(21) Appl. No.: 09/995,128

(22) Filed: Nov. 27, 2001

(65) Prior Publication Data

US 2003/0016366 A1 Jan. 23, 2003

(30) Foreign Application Priority Data

Apr. 20, 2001 (JP) ....................................... 2001-122723

(51) Int. Cl.$^7$ .............................................. G01B 11/24
(52) U.S. Cl. .................................. 356/604; 250/237 G
(58) Field of Search ........................ 356/604, 601, 356/602, 603, 605, 608, 616, 618, 619, 623, 489, 495, 511; 250/237 G (56) References Cited

U.S. PATENT DOCUMENTS

| | | | | |
|---|---|---|---|---|
| 4,668,094 A | * | 5/1987 | Matsumoto et al. | ......... 356/603 |
| 4,802,759 A | * | 2/1989 | Matsumoto et al. | ......... 356/603 |
| 5,135,309 A | * | 8/1992 | Kuchel et al. | ............... 356/604 |
| 5,202,749 A | * | 4/1993 | Pfister | ........................ 356/605 |
| 5,307,151 A | * | 4/1994 | Hof et al. | .................... 356/604 |
| 5,343,294 A | * | 8/1994 | Kuchel et al. | ............... 356/604 |
| 5,406,342 A | * | 4/1995 | Jongsma | ..................... 351/212 |
| 6,341,016 B1 | * | 1/2002 | Malione | ..................... 356/603 |
| 6,369,899 B1 | * | 4/2002 | Hamada | ..................... 356/603 |
| 6,559,954 B2 | * | 5/2003 | Takata et al. | ................ 356/604 |

FOREIGN PATENT DOCUMENTS

| | | | | |
|---|---|---|---|---|
| JP | 408101025 A | * | 4/1996 | |
| JP | 10-246612 | | 9/1998 | |
| JP | 411338124 A | * | 12/1999 | |
| JP | 2000-292131 | | 10/2000 | ........... G01B/11/24 |

* cited by examiner

Primary Examiner—Hoa Q. Pham
(74) Attorney, Agent, or Firm—Davis & Bujold, PLLC (57) ABSTRACT

A three-dimensional shape measuring method by which measurement of a three-dimensional shape is realized with an improved precision. Grid patterns comprising a plurality of one-dimensional grids 1, 2 and 3, each having a period and direction different from those of the others, are simultaneously projected upon objects to be measured, using different colors for each of the one-dimensional grids 1, 2 and 3. Subsequently, a grid image deformed in accordance with the three-dimensional shapes of the objects to be measured is imaged, the grid image is separated by colors into one-dimensional grid components of each color, a phase for each of the one-dimensional grid components is detected, and then, measurement values of the three-dimensional shapes are obtained on the basis of the detected phases. At the same time, by imaging the objects to be measured by use of white light, color information on the objects to be measured are measured as well.

12 Claims, 8 Drawing Sheets

FIG. 1A
RED

FIG. 1B
GREEN

FIG. 1C
BLUE

THREE-DIMENSIONAL SHAPE MEASURING METHOD

FIELD OF THE INVENTION

The present invention relates to a three-dimensional shape measuring method, more particularly, to a method of measuring an object having a three-dimensional shape, by projecting grid patterns upon the object and using a projection image thereof.

BACKGROUND OF THE INVENTION

It is conventionally known to measure the three-dimensional shape of an object by projecting grid patterns upon the object and using a grid image thereby obtained and deformed in accordance with the height distribution of parts of the object, such methods being, for example, the moire method and the heterodyne method. In the moire method, a reference grid is superimposed upon the deformed grid image, thereby generating Moire fringes, which provide contour lines of the object to be measured, to obtain the height distribution. In the heterodyne method, using a non-modulated spatial carrier frequency signal and a carrier signal spatially phase-modulated as the reference grid and the deformed grid image, the amount of deformation is detected as a phase, thereby obtaining the height distribution of the object to be measured.

These methods are effective in the measurement of a three-dimensional shape of an object having smooth faces and parts mutually continuously connected. On the other hand, these methods are not applicable to measuring a three-dimensional shape of an object having large discontinuous steps nor an object composed of isolated faces having no mutual contact points. This is because, in the case of the moire method, a fringe order of the discontinuous contour line cannot be uniquely determined and, in the case of the heterodyne method, the height distribution of such a discontinuous object cannot be uniquely determined from the phase distribution detected in such a manner as being folded in the range of the principal value of $[-\pi, \pi]$.

In order to measure the three-dimensional shape of an object which has such discontinuous steps, Unexamined Japanese Patent Publication No. 10-246612 discloses a method comprising the steps of: projecting upon the object to be measured a two-dimensional grid pattern formed by superimposing a plurality of one-dimensional grids each having a period and direction different from those of the others; imaging a two-dimensional grid image deformed in accordance with the three-dimensional shape of the object to be measured; detecting a phase for each of the one-dimensional grid components from the two-dimensional grid image; and obtaining the measurement value of the three-dimensional shape of the object to be measured on the basis of the detected phases.

In such a conventional method, however, if a larger number of one-dimensional grids having different periods and directions are used, there are more intersections among the one-dimensional grids in the grid image. In the case of an increased number of intersections existing in the grid image, frequency separation is difficult after imaging the two-dimensional grid image. In this case, the one-dimensional grids affect each other as noise sources and, therefore, precise measurement of the three-dimensional shape of the object to be measured is made impossible.

SUMMARY OF THE INVENTION

The present invention was made to solve the aforementioned problem. More particularly, the object of the present invention is to provide a method of measuring the shape of an object having three-dimensions, with improved precision.

In order to attain this object, there is provided a method for obtaining a measurement value of a three-dimensional shape of an object, using a grid image formed by projecting a plurality of grid patterns upon the object to be measured, the method comprising the steps of: projecting the grid patterns upon the object to be measured, the grid patterns comprising a plurality of one-dimensional grids of different colors, each having a distinctive period and direction; imaging the grid patterns deformed in accordance with the three-dimensional shape of the object to be measured; separating from the grid image each of the one-dimensional grids of different colors; detecting a phase for each of the one-dimensional grids; and obtaining the measurement value on the basis of the detected phases.

The one-dimensional grids of different colors may be red, green and blue. Also, it is preferable that a straight line connecting the center of a projection lens, which projects light sources in the form of grid patterns, with the center of an image formation lens, which senses the image of the grid patterns, is parallel to a reference surface on which the object to be measured is placed. Furthermore, the method may further comprise a step of measuring color information of the object to be measured by imaging the object to be measured by use of white light.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1A:
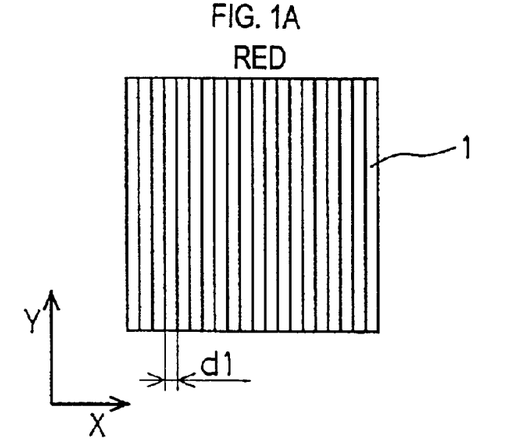
FIGS. 1A, 1B and 1C are enlarged explanatory views of one-dimensional grids used in a three-dimensional shape measuring method according to one embodiment of the invention.
Figure 1B:
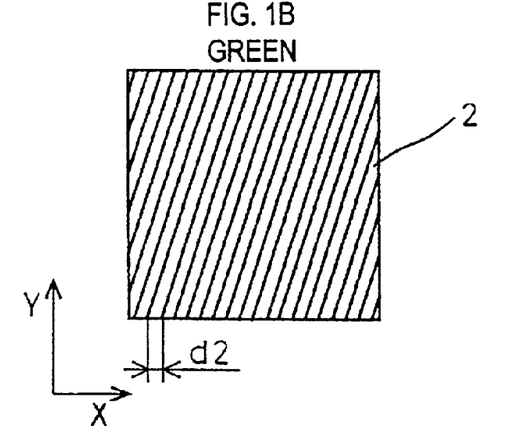

As shown in FIG. 1A, a one-dimensional grid 1 as used in this embodiment is red. The one-dimensional grid 1 is composed of red lines periodically repeated (with period d1) and extending in the vertical direction. Also, as shown in FIG. 1B, a one-dimensional grid 2 as used in this embodiment is green. The one-dimensional grid 2 is composed of green lines periodically repeated (with period d2) and extending in an oblique direction.

Figure 1C:
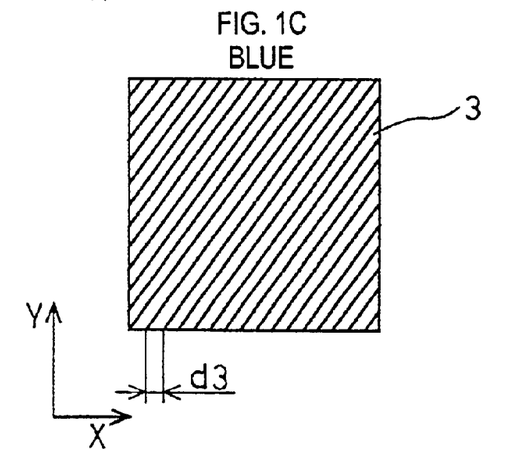

Furthermore, as shown in FIG. 1C, a one-dimensional grid 3 as used in this embodiment is blue. The one-dimensional grid 3 is composed of blue lines periodically repeated (with period d3) and extending in an oblique direction of which an oblique angle is greater than that of the green lines.

The one-dimensional grids 1, 2 and 3 may be composed of dots, instead of lines. Also, for the one-dimensional grids 1, 2 and 3, sinusoidal grids are ideally used, which contain no unnecessary harmonic components. However, it is also possible to use rectangular grids that can be made more easily, by removing such unnecessary harmonic components at the stage of signal processing.

The periods d1, d2 and d3 of the one-dimensional grids 1, 2 and 3, respectively, in the direction of a straight line connecting the center of a projection lens 5 with the center of an image formation lens 9, both of which are described later, correspond to measurement sensitivities for transforming the height of an object to be measured into the phase value and, therefore, the periods d1, d2 and d3 should have different values from each other. For example, in cases where the congruence method is used as a method of obtaining the height distribution of an object to be measured by integrating a plurality of measurement data obtained in accordance with different phase sensitivities, the ratio of d1 to d2 to d3 is preferably set to be 3 to 5 to 7, or any other ratio represented by prime numbers.

Figure 2:
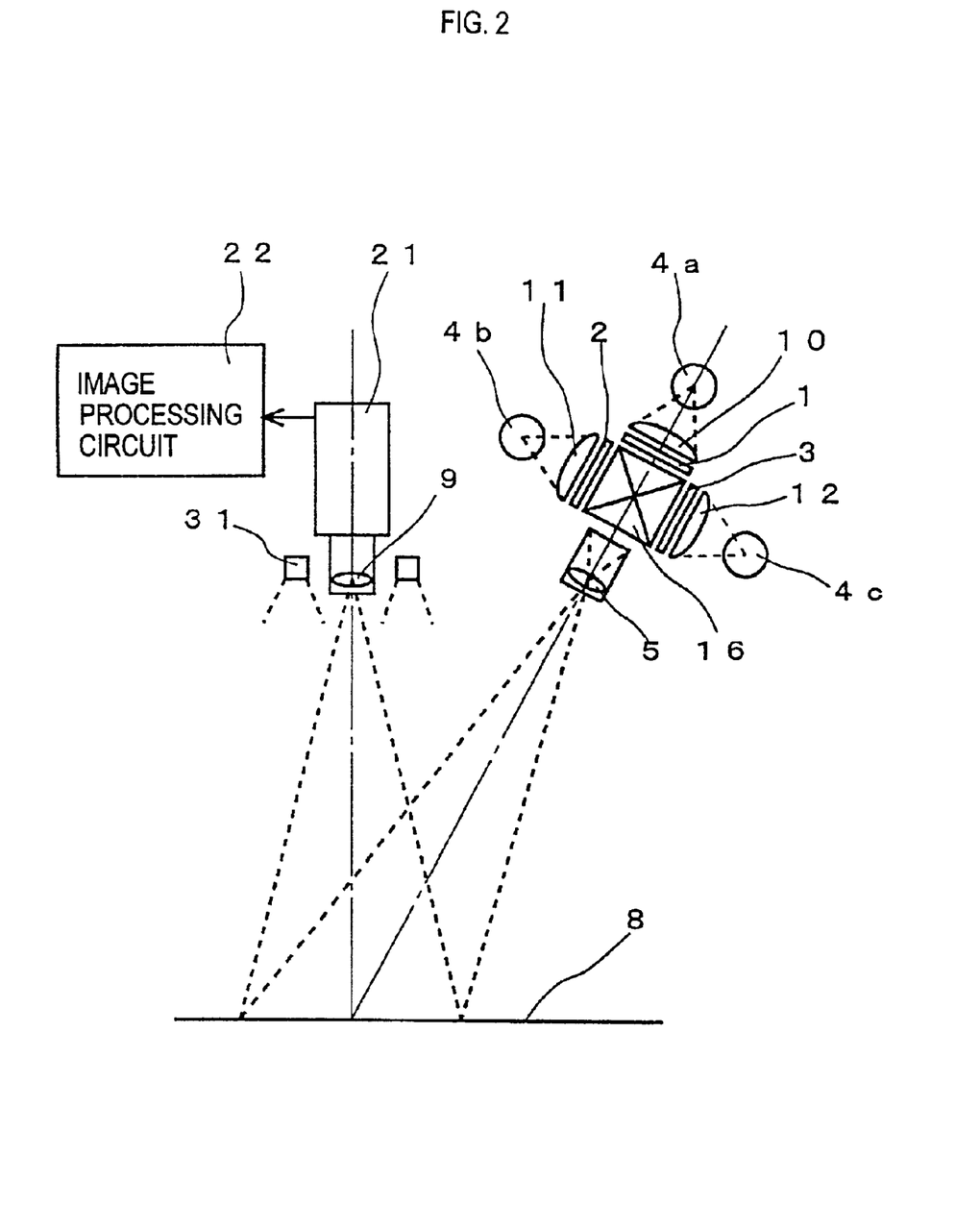
FIG. 2 is a schematic block diagram of a device to which the three-dimensional shape measuring method according to the embodiment is adapted.

Now, as shown in FIG. 2, the one-dimensional grids 1, 2 and 3 are illuminated, via lenses 10, 11 and 12, respectively, with their respective white light sources 4a, 4b and 4c. In this embodiment, the red grid of one dimension 1 is disposed coaxially relative to an optical axis of the projection lens 5. The red grid of one dimension 1 is illuminated by the white light source 4a, such that an image thereof is projected, by the projection lens 5, upon a reference surface 8.

Also, the green grid of one dimension 2 is disposed in parallel with the optical axis of the projection lens 5. The green grid of one dimension 2 is illuminated by the white light source 4b, such that an image thereof is projected, via a prism mechanism 16, by the projection lens 5, upon the reference surface 8. Furthermore, the blue grid of one dimension 3 is disposed in such a manner that it is opposed to the green grid of one dimension 2, with the optical axis intervening therebetween. The blue grid of one dimension 3 is illuminated by the white light source 4c, such that an image thereof is projected, via the prism mechanism 16, by the projection lens 5, upon the reference surface 8.

Figure 3:
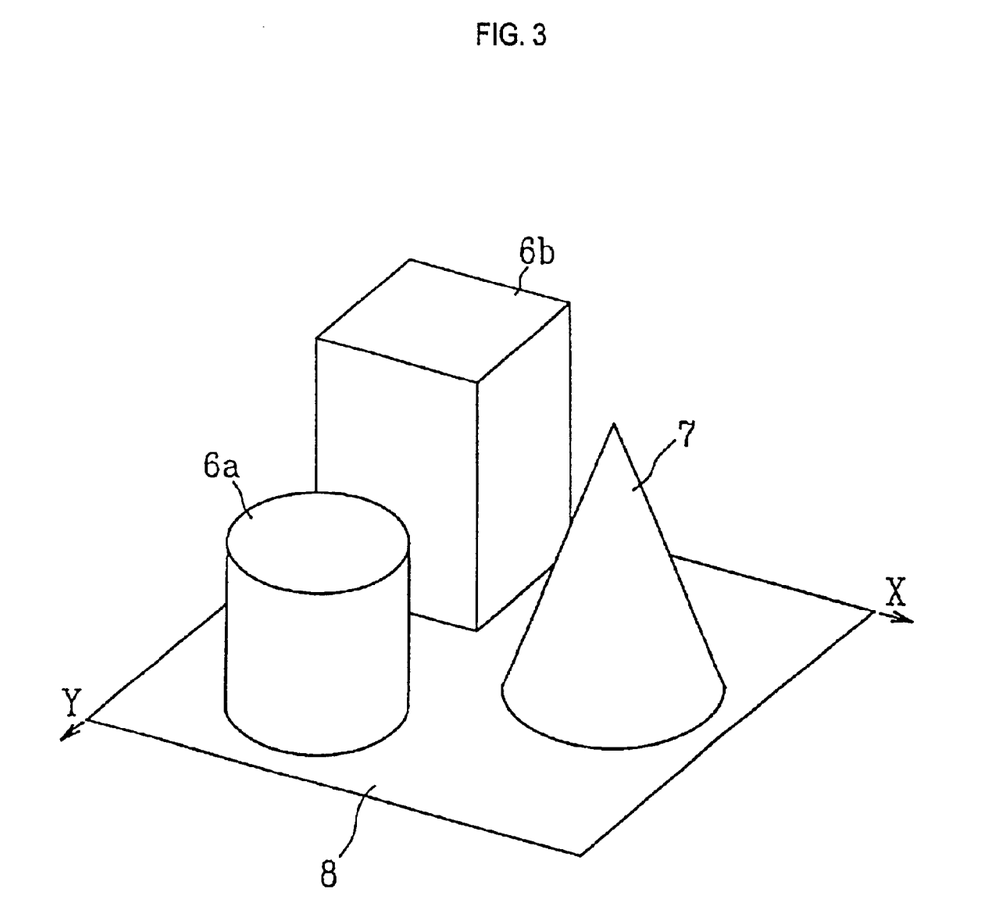
FIG. 3 is a perspective view of objects to be measured according to the embodiment.

In this embodiment, as shown in FIG. 3, three objects to be measured 6a, 6b and 7 are individually composed of isolated faces having no mutual contact points. The three objects to be measured 6a, 6b and 7 are placed on the reference surface 8, which serves as a reference plane for measurement of height. The image formation lens 9 forms, in an image sensor 21, an image of the grid patterns projected upon the objects to be measured 6a, 6b, 7 and the reference surface 8, as a grid image 20. In this embodiment, a three-CCD camera is employed as the image sensor 21, and image data obtained from the image sensor 21 are inputted into an image processing circuit 22. A straight line which connects the center of the projection lens 5 with the center of the image formation lens 9 is made parallel relative to the reference surface 8 such that the reference surface 8 serves as a reference plane for measurement of height.

Furthermore, arrangement is made in such a manner that an optical axis of the image formation lens 9 is perpendicular to the reference surface 8, and a straight line connecting the center of the projection lens 5 with the center of the image formation lens 9 extends in the horizontal direction. In this manner, the measurement sensitivity ratio for transforming the height of the objects to be measured 6a, 6b and 7 into the phase value is determined by a periodic ratio in the horizontal direction of the one-dimensional grids 1, 2 and 3, that is, d1:d2:d3, and is not dependent upon a periodic ratio in the vertical direction thereof. As a result, oblique angles of the lines can be selected freely when the one-dimensional grids 1, 2 and 3 are superimposed and multiplexed. Taking advantage of such a degree of freedom in selecting the oblique angles of the lines, directions of the lines are determined in such a manner that spatial frequency spectral components of the one-dimensional grids 1, 2 and 3 can be separated from each other, such that selective extraction of the spectrums is made possible by means of a spatial frequency filter.

As shown in FIG. 3, one of the objects to be measured in this embodiment is a circular cylinder 6a which is 20 mm high. Another object to be measured is a rectangular parallelepiped 6b which is 30 mm high. These objects to be measured 6a and 6b have large discontinuous steps along their edges, and are composed of isolated faces having no mutual contact points. The other object to be measured in this embodiment is a circular cone 7 which is 25 mm high at its top and has a continuous height distribution of a pointed shape.

Figure 4:
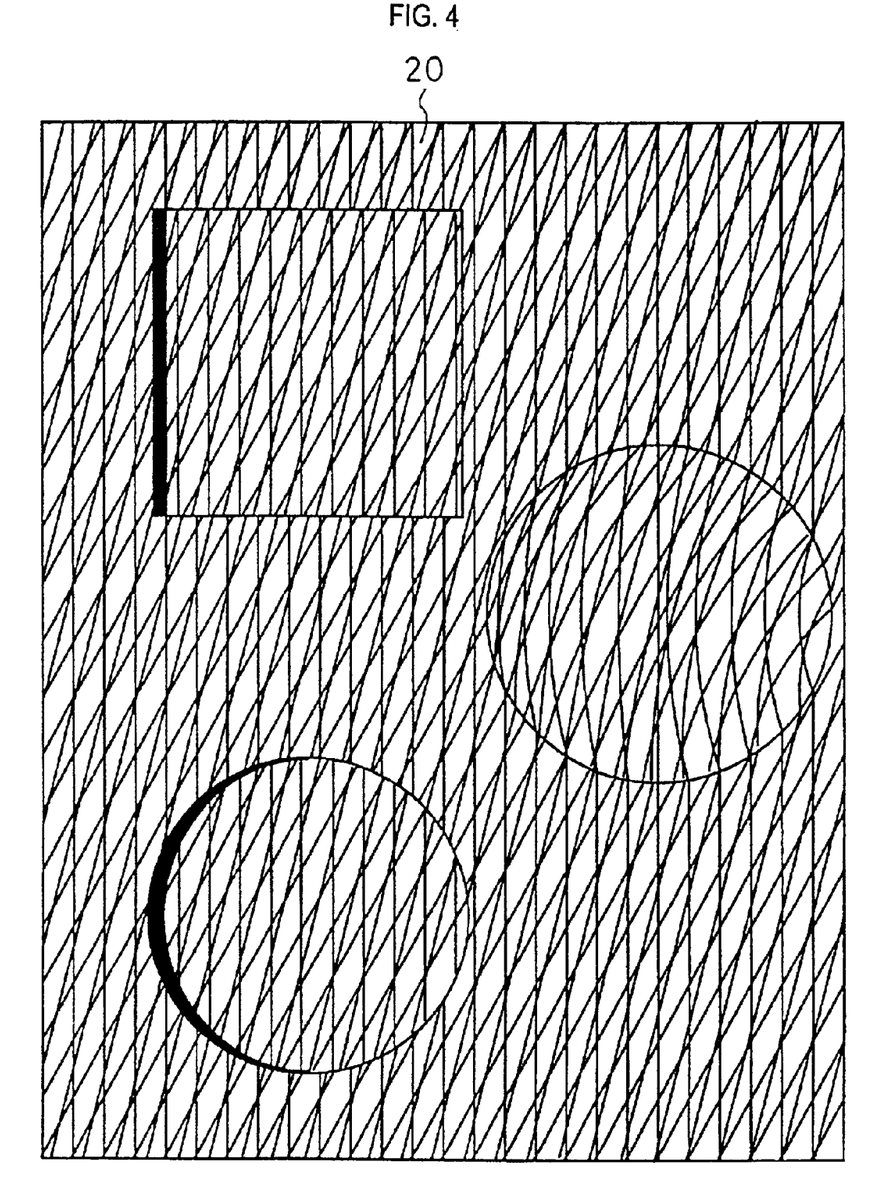
FIG. 4 is an explanatory view of a two-dimensional grid image according to the embodiment.

All grid patterns of the one-dimensional grids 1, 2 and 3 are simultaneously projected upon the objects to be measured 6a, 6b and 7 by the respective white light sources 4a, 4b and 4c, as shown in FIG. 2. Then, the grid image 20 thereby made is imaged by the image sensor 21. The grid image 20 is, as shown in FIG. 4, deformed in accordance with the three-dimensional shapes of the objects to be measured 6a, 6b and 7. Also, in the grid image 20, three patterns of the one-dimensional grids 1, 2 and 3, of which the periodic ratio in the horizontal direction d1:d2:d3 is 3:5:7, and which are composed of a plurality of lines extending in the vertical direction or in the oblique directions, are superimposed upon each other.

A grid image pattern g(x, y) phase-modulated by a height h(x, y) of an object to be measured is represented using the following formula (1), where $f_{Xk}$ and $f_{Yk}$ denote spatial frequencies and r(x, y) denotes a reflectance on a surface of the object to be measured:

[Formula 1]

$$g(x, y) = r(x, y) \sum_{K=1}^{K} \{1 + \cos[2\pi(f_{Xk}x + f_{Yk}y) + \phi_k(x, y)]\} \quad (1)$$

$\phi_k = 2\pi \tan \theta f_{Xk} h(x, y)$

It is possible, by spatial frequency filtering in the Fourier transform method, to separate $\phi_k$ (x, y) and individually extract the same. Each $h_k$ (x, y) thereby obtained is folded in the principal value of $\Delta h_k$ (refer to the following formula (2)) and, therefore, these data are respectively congruent, with $\Delta h_k$ being a modulus. If the periodic ratio in the x-direction is selected on the basis of the following formula (3), where $m_k$ denote a plurality of simple integers prime to each other, the following formulas (4) and (5) are in the simultaneous congruence, with $m_k$ (=$\Delta h_k/\alpha$) being a modulus (refer to the following formula (6)). Consequently, obtaining of the height h(x, y) of the object to be measured results in a solution of this simultaneous congruence equation.

[Formula 2]

$$\Delta h_k = 1/(f_{Xk} \tan \theta) \quad (2)$$

$$\frac{(1/f_{Xk})}{m_k} = \alpha \tan\theta (\text{constant}) \quad (k=1, 2, \ldots, K) \quad (3)$$

$$\hat{X} = h(x, y)/\alpha \quad (4)$$

$$\hat{b}_k = h_k(x, y)/\alpha \, (k=1, 2, \ldots, K) \quad (5)$$

$$\hat{X} \equiv \hat{b}_k (\bmod m_k)(k=1, 2, \ldots, K) \quad (6)$$

Figure 7:
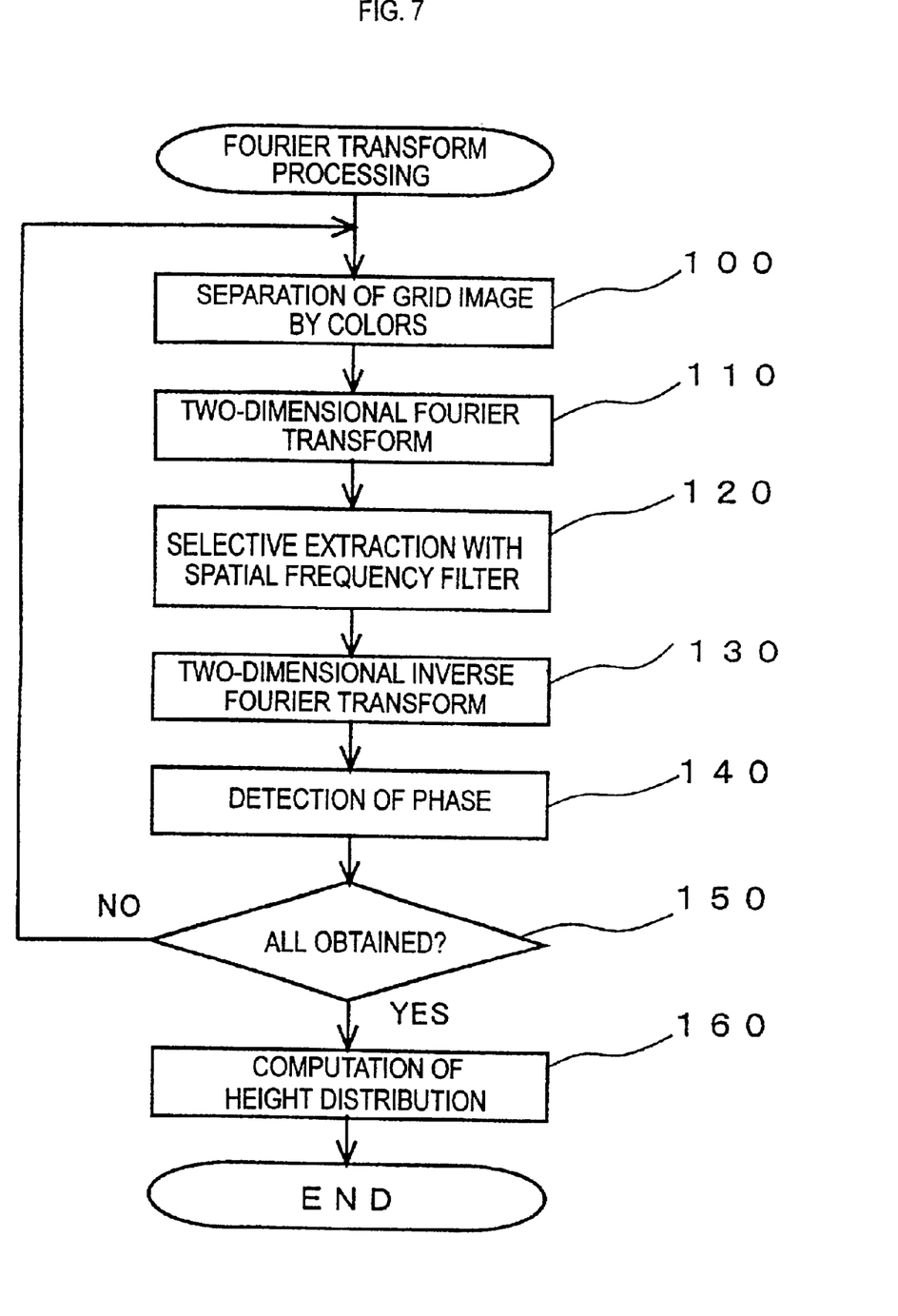
FIG. 7 is a flow chart showing an example of Fourier transform processing executed in an image processing circuit according to the embodiment.

The grid image pattern from the image sensor 21 is inputted into the image processing circuit 22, where processing as shown in FIG. 7 is executed. In the image processing circuit 22, a grid image of each color is first separated from the entire grid image 20 comprising a plurality of grid images of different colors superimposed (step 100). Subsequently, image data corresponding to each grid image separated by colors are two-dimensionally Fourier transformed, thereby obtaining the intensity distribution of spatial frequency spectrums (step 110).

Figure 5:
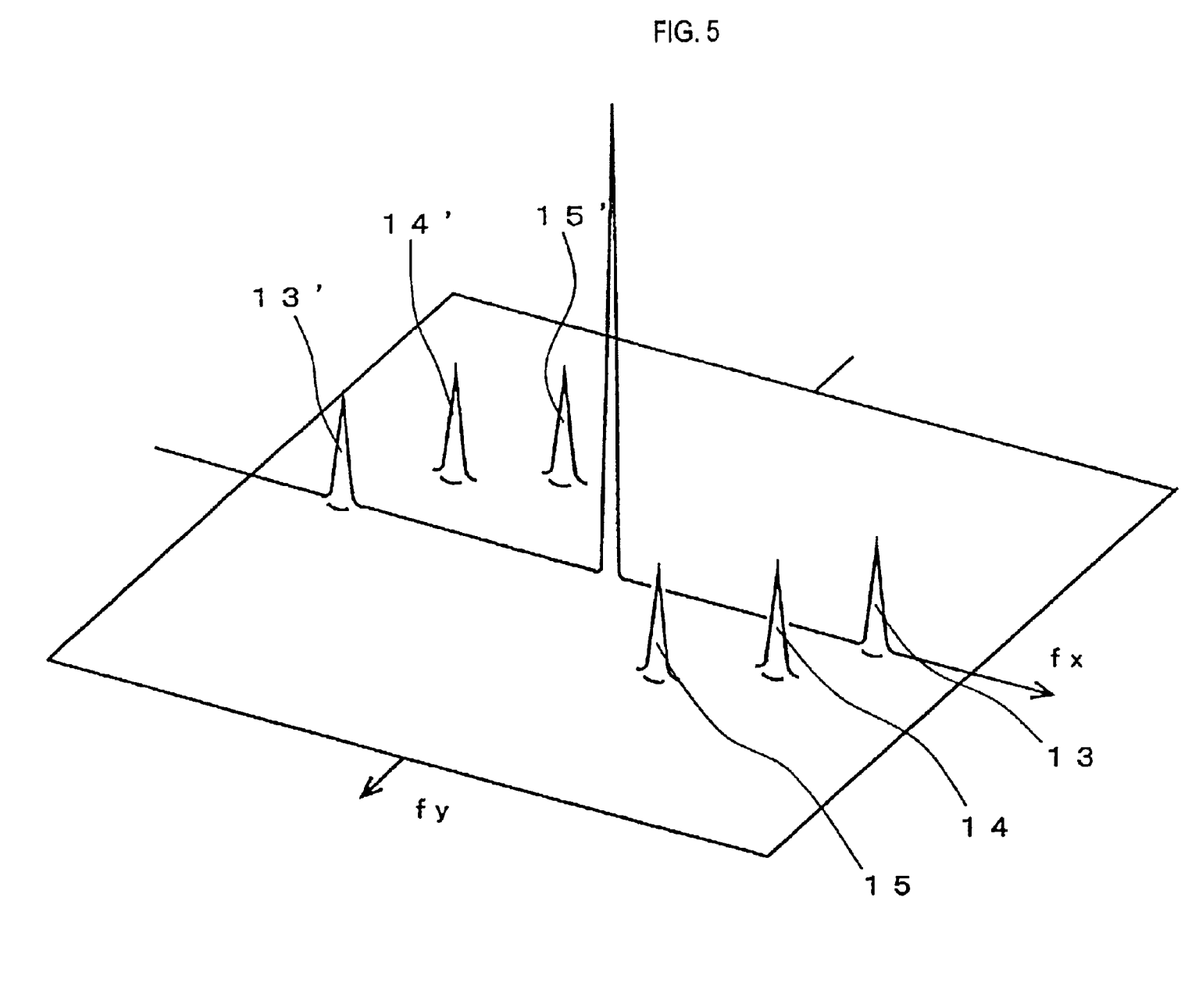
FIG. 5 is a perspective view showing an intensity distribution of spatial frequency spectrums of the objects to be measured according to the embodiment.

Shown in FIG. 5 is a perspective view of the intensity distribution of the spatial frequency spectrums obtained by the two-dimensional Fourier transform. Spatial frequency spectrums 13 and 13' of the one-dimensional red grid 1, spatial frequency spectrums 14 and 14' of the one-dimensional green grid 2, and spatial frequency spectrums 15 and 15' of the one-dimensional blue grid 3 are separated as shown in FIG. 5, in a two-dimensional spatial frequency domain. Thus, spectral components corresponding to the spatial frequency spectrums of each of the one-dimensional grids 1, 2 and 3 can be selectively extracted by means of a spatial frequency filter (step 120).

Subsequently, a two-dimensional inverse Fourier transform is performed with respect to the spatial frequency spectrum selectively extracted (step 130), and then, a phase is heterodyne-detected (step 140). There are three grids of one dimension 1, 2 and 3 multiplexed in this embodiment; however, as it is clear in view of the spectral distribution as shown in FIG. 5, it is also possible to multiplex more one-dimensional grids of various colors and separate each spectrum therefrom.

The aforementioned steps 100 to 140 are repeated, thereby detecting a phase for each of the multiplexed spectrums (step 150). Once the phases for all of the multiplexed spectrums are obtained, the height distribution is obtained using an existing method (step 160). As a method of obtaining the height distribution by integrating a plurality of measurement data obtained in accordance with different phase sensitivities, a congruence method or a coincidence method, for use in a multiwavelength interference measurement, or any other method currently existing can be used.

The heterodyne-detected phases are folded in the range of the principal value of $[-\pi, \pi]$. Since the measurement sensitivities for transforming the height of the objects to be measured 6a, 6b and 7 into the phase value are differently set in the ratio of 3:5:7, correspondingly to the periodic ratio in the horizontal direction of the one-dimensional grids 1, 2 and 3, three-dimensional shape distributions folded in the ranges of different heights are obtained for each of the frequency spectrums, as shown in FIGS. 6A, 6B and 6C.

Figure 6A:
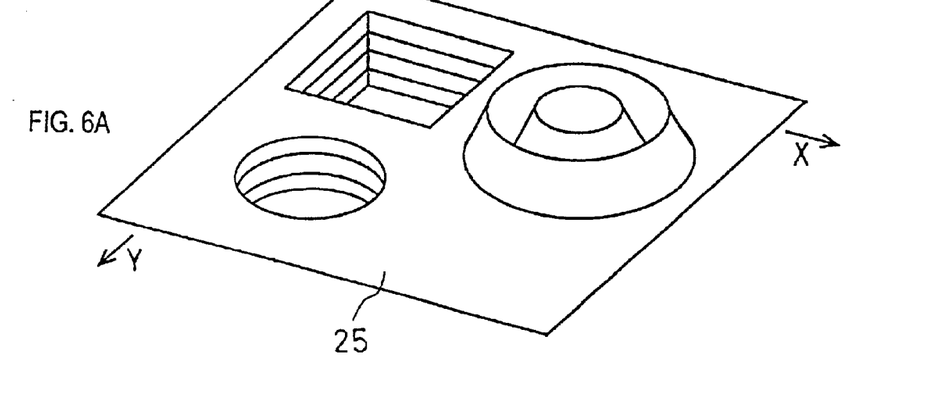
FIGS. 6A, 6B and 6C are perspective views showing height distributions of the objects to be measured according to the embodiment, the height distributions being folded in accordance with different sensitivities.

A three-dimensional shape distribution 25 as shown in FIG. 6A is a height distribution obtained by extracting the spectral component 13 of the one-dimensional red grid 1, comprising lines extending in the vertical direction, by means of a filter, and then, performing a heterodyne detection. The three-dimensional shape distribution 25 is folded in the range of 3 mm high. Also, a three-dimensional shape distribution 26 as shown in FIG. 6B is a height distribution obtained by extracting the spectral component 14 of the one-dimensional green grid 2, comprising lines extending in an oblique direction, by means of a filter, and then, performing a heterodyne detection. The three-dimensional shape distribution 26 is folded in the range of 5 mm high.

Figure 6B:
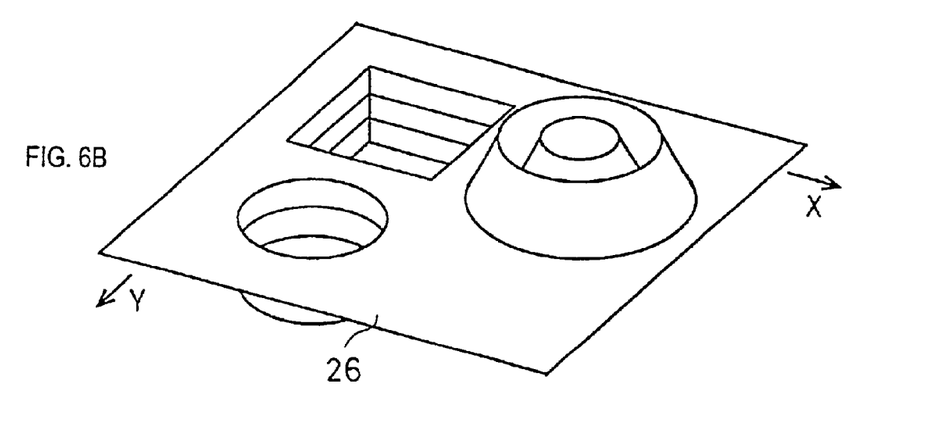
Figure 6C:
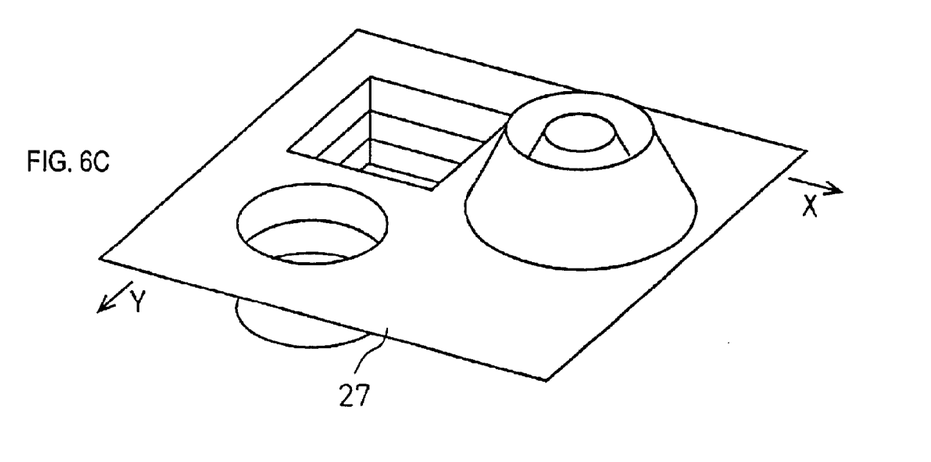

Furthermore, a three-dimensional shape distribution 27 as shown in FIG. 6C is a height distribution obtained by extracting the spectral component 15 of the one-dimensional blue grid 3, comprising lines extending in an oblique direction, by means of a filter, and then, performing a heterodyne detection. The three-dimensional shape distribution 27 is folded in the range of 7 mm high. In these manners, it is possible to simultaneously obtain a plurality of measurement data, in accordance with three different sensitivities, from the grid images of the one-dimensional grids 1, 2 and 3 of different colors as shown in FIGS. 1A, 1B and 1C. If more grid patterns of various colors are multiplexed, even more data measured in accordance with different sensitivities can be obtained.

When a conventional heterodyne method is adopted, in which case no multiplexing of spatial frequencies is performed unlike the method of the invention, any one of the height distributions 25, 26 and 27 folded as shown in FIGS. 6A, 6B and 6C, respectively, is only obtained. In the case of objects to be measured having large discontinuous steps along their edges and composed of isolated faces having no mutual contact points, such as the objects to be measured 6a and 6b in FIG. 3, it is impossible to uniquely determine the three-dimensional shapes thereof in view of any one of the height distributions 25, 26 and 27. Accordingly, it is essential to simultaneously obtain a plurality of measurement data, in accordance with a plurality of different sensitivities, from the grid image 20 comprising a plurality of one-dimensional grids of different colors, like the method of the invention.

As a method of determining a three-dimensional shape by integrating the data of the three height distributions 25, 26 and 27, as shown in FIGS. 6A, 6B and 6C, respectively, folded in the height sensitivity ratio of 3:5:7, the congruence method, which is well known in the field of multiwavelength interference measurement, may be used. Using this method, the three-dimensional shape distributions of the objects to be measured 6a, 6b and 7, as shown in FIG. 3, can be precisely obtained.

Figure 8:
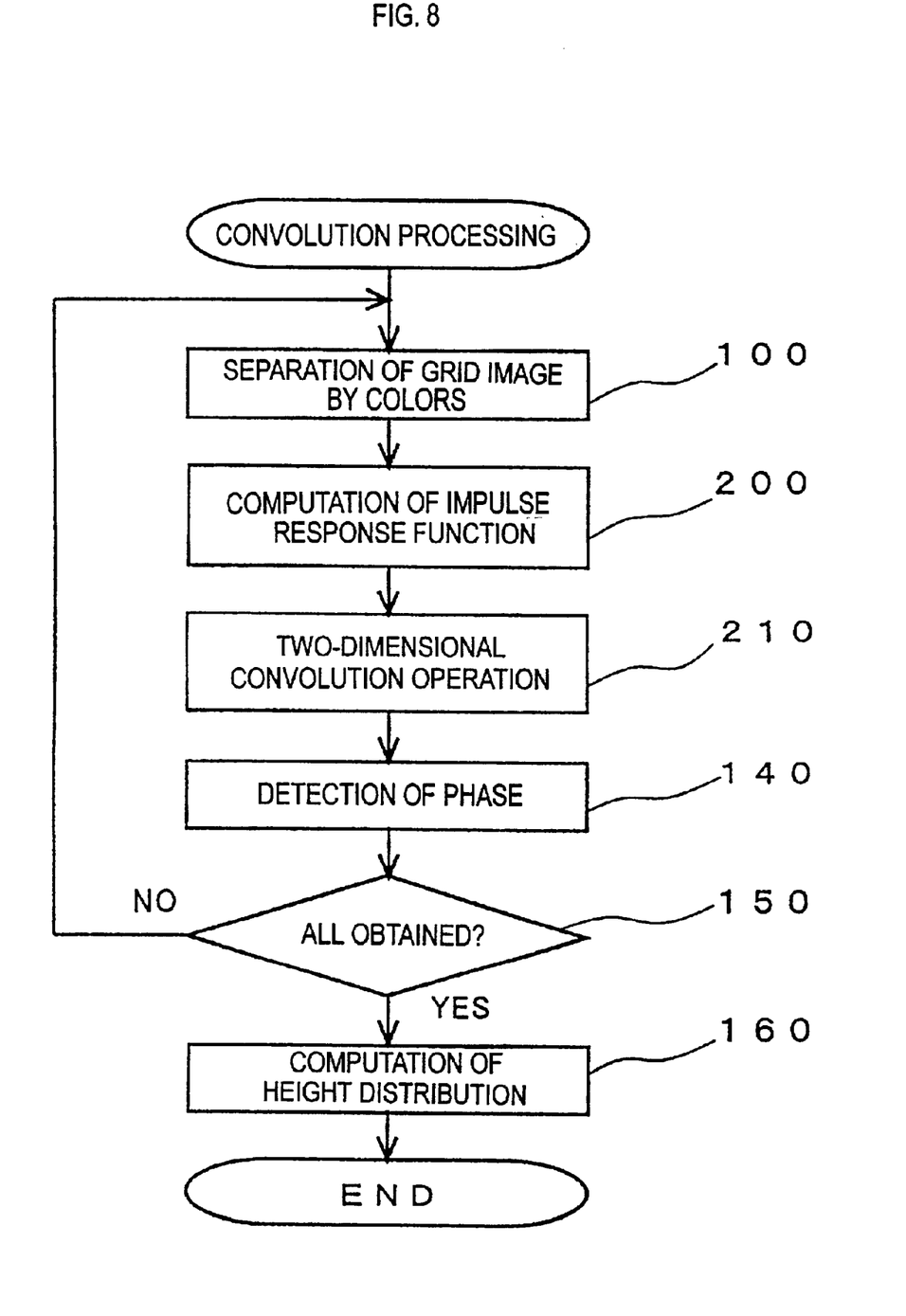
FIG. 8 is a flow chart showing an example of convolution processing executed in an image processing circuit according to the embodiment.

For processing equivalent to two-dimensionally Fourier transforming the entire grid image 20 and performing filtering for selective extraction of desired spectral components, it is also possible to carry out direct operations with respect to the grid image 20. More specifically, as shown in FIG. 8, each grid image is first separated by colors from the superimposed grid image 20 (step 100). Subsequently, a two-dimensional filter window function used in selective extraction of desired spectrums is inversely-Fourier transformed in order to obtain a two-dimensional impulse response function (step 200). Then, using the obtained two-dimensional impulse response function, a direct, two-dimensional convolution operation is carried out with respect to the grid image 20 (step 210). In this manner, the spectral components corresponding to the respective spatial frequencies of the one-dimensional grids 1, 2 and 3 can be selectively extracted. The following processes (steps 130 to 150) are the same as aforementioned and, therefore, reference thereto is not made here.

According to the method of the present invention, the spatial frequency multiplexed grid image 20 deformed in accordance with the respective three-dimensional shapes of the objects to be measured 6a, 6b and 7 is imported into the image processing circuit 22, and a grid image of each color is separated from the entire grid image 20, and the spectral components corresponding to the respective spatial frequencies of the one-dimensional grids 1, 2 and 3 are selectively extracted by means of the spatial frequency filter, and then, the phases of the spectral components are individually heterodyne-detected.

This processing of spatial frequency filtering may be carried out in a frequency spectral region, where the deformed grid image is two-dimensionally Fourier-transformed. Otherwise, the two-dimensional convolution operation equivalent to such processing may be directly performed in relation to the two-dimensional grid image. The heterodyne-detected phases are folded in the range of the principal value of $[-\pi, \pi]$. Since the measuring sensitivities for transforming the height of the objects to be measured 6a, 6b and 7 into the phase value are different depending on the spatial frequencies of the one-dimensional grids 1, 2 and 3, various three-dimensional shape distributions are obtained in which the phases are folded in the ranges of different heights depending on each frequency spectrum.

Consequently, it becomes possible, by integrating a plurality of measurement data obtained from the spectral components of the one-dimensional grids 1, 2 and 3, to individually determine the height of the objects to be measured at each single measurement point, regardless of existence of discontinuous steps or isolated faces on the objects to be measured. Also, instantaneous measurement is possible by only one-time projection of the grid patterns, thereby enabling the measurement of an instantaneous shape of a discontinuous object during its high-speed movement or high-speed deformation.

In addition, the entire grid image is separated by colors, more specifically, into a red, green and blue grid images and, therefore, each grid image separated by colors has no portion where the grid images of different colors intersect. Consequently, the noise generated by the grid images of the other one-dimensional grids 1, 2 and 3 can be abated, which results in a high-precision measurement of the shape. Furthermore, as shown in FIG. 2, a ring-shaped white color source 31 is disposed coaxially relative to the image sensor 21, such that white light is projected upon the objects to be measured 6a, 6b and 7 from the white color source 31, while color images of the objects to be measured 6a, 6b and 7 are imaged by the image sensor 21. From each pixel of the color images, color information of the objects to be measured is obtained. In this manner, the color information as well as the measurement data on the three-dimensional shape can be obtained at the same time.

The present invention is, of course, not restricted to the embodiment as described above, and may be practiced or embodied in still other ways without departing from the subject matter thereof.

As mentioned above, adopting the three-dimensional shape measuring method of the invention, it is possible to instantaneously measure the three-dimensional shape of an object having large discontinuous steps or composed of isolated faces having no mutual contact points, by only one-time projection of grid patterns upon the object. Consequently, measurement of an instantaneous shape of a discontinuous object during its high-speed movement or high-speed deformation is also made possible, which has been difficult according to the conventional measuring methods. In addition, the entire grid image is separated by colors and, therefore, each individual grid image after separation has no portion where the grid images of different colors intersect. Consequently, the noise generated by the grid images of the other one-dimensional grids can be abated, which results in a high-precision measurement of the shape.

What is claimed is:

1. A method for obtaining a measurement value of a three-dimensional shape of an object, using a grid image formed by projecting a plurality of grid patterns upon the object to be measured, the method comprising the steps of:

providing a plurality of one-dimensional grids of different colors, with each one of the plurality of one-dimensional grids of different colors having a different rotation angle from another;

projecting the grid patterns, from the plurality of one-dimensional grids of different colors, upon the object to be measured;

imaging the grid patterns deformed in accordance with the three-dimensional shape of the object to be measured;

separating from the grid image each of the one-dimensional grids of different colors;

detecting a phase for each of the one-dimensional grids; and obtaining the measurement value on the basis of the detected phases.

2. The method for obtaining a measurement value of a three-dimensional shape of an object as recited in claim 1, wherein the colors of the one-dimensional grids of different colors are red, green and blue.

3. The method for obtaining a measurement value of a three-dimensional shape of an object as recited in claim 2, wherein the colors of the one-dimensional grids of different colors are projected through a plurality of prism mechanisms by a plurality of white light sources.

4. The method for obtaining a measurement value of a three-dimensional shape of an object as recited in claim 2, wherein the grid patterns comprise dots.

5. The method for obtaining a measurement value of a three-dimensional shape of an object as recited in claim 1, wherein the grid patterns comprise sinusoidal lines.

6. The method for obtaining a measurement value of a three-dimensional shape of an object as recited in claim 1, wherein a straight line connecting a center of a projection lens which projects the grid patterns with a center of an image formation lens which senses the images of the grid patterns is parallel to a reference surface on which the object to be measured is placed.

7. The method for obtaining a measurement value of a three-dimensional shape of an object as recited in claim 6, wherein an optical axis of the image formation lens is perpendicular to the reference surface.

8. The method for obtaining a measurement value of a three-dimensional shape of an object as recited in claim 1, further comprising the step of measuring color information of the object to be measured by imaging the object using white light.

9. The method for obtaining a measurement value of a three-dimensional shape of an object as recited in claim 1, wherein the phases for each of the one-dimensional grids have periods that when compared to each other have ratios represented by prime numbers.

10. The method for obtaining a measurement value of a three-dimensional shape of an object as recited in claim 9, wherein a measurement sensitivity ratio for transforming a height of the object into a phase value is determined from a periodic ratio in a horizontal direction of the one-dimensional grids.

11. The method for obtaining a measurement value of a three-dimensional shape of an object, using a grid image formed by projecting a plurality of grid patterns upon the object to be measured, the method comprising the steps of:

provided at least three one-dimensional grids of different colors, with each one of the at least three one-dimensional grids of different colors having a different rotation angle from another;

projecting the grid patterns, from the at least three-dimensional grids of different colors, upon the object to be measured;

imaging the grid patterns deformed in accordance with the three-dimensional shape of the object to be measured;

separating from the grid image each one-dimensional grid component of different colors;

obtaining an intensity distribution of spatial frequency spectrums through Fourier-transformation;

selectively extracting spectral components corresponding to the spatial frequency spectrums by means of a spatial frequency filter;

performing an inverse two-dimensional Fourier transform on the selected spectral component;

detecting a phase for each of the one-dimensional grid components; and obtaining the measurement value on the basis of the detected phases.

12. A method for obtaining a measurement value of a three-dimensional shape of an object, using a grid image formed by projecting a plurality of grid patterns upon the object to be measured, the method comprising the steps of:

providing at least three one-dimensional grids of different colors, with each one of the at least three one-dimensional grids of different colors having a different rotation angle from another;

projecting the grid, from the at least three one-dimensional grids of different colors, upon the object to be measured;

imaging the grid patterns deformed in accordance with the three-dimensional shape of the object to be measured;

separating from the grid image each one-dimensional grid component of different colors;

extracting, selectively, through a two-dimensional filter window function a desired spectrum and inversely Fourier transforming the spectrum to obtain a two-dimensional impulse response function;

carrying out a direct, two-dimensional convolution operation on the two-dimensional impulse response function to obtain spectral components corresponding to the one-dimensional grid components;

detecting a phase for each of the one-dimensional grid components; and obtaining the measurement value on the basis of the detected phases.

\* \* \* \* \*